May 19, 1970 A. V. OGRODSKI 3,513,454

METHOD OF OPERATING MAGNETIC CORE MEMORIES TO COMPENSATE FOR TEMPERATURE VARIATIONS

Filed March 22, 1968 4 Sheets-Sheet 1

INVENTOR.
ALBERT V. OGRODSKI
BY Edward Dugas
ATTORNEY

INVENTOR.
ALBERT V. OGRODSKI
BY Edward Dugas
ATTORNEY

INVENTOR.
ALBERT V. OGRODSKI
BY Edward Dugas
ATTORNEY

INVENTOR.
ALBERT V. OGRODSKI
BY Edward Dugas
ATTORNEY

United States Patent Office 3,513,454

Patented May 19, 1970

3,513,454

METHOD OF OPERATING MAGNETIC CORE MEMORIES TO COMPENSATE FOR TEMPERATURE VARIATIONS

Albert V. Ogrodski, Placentia, Calif., assignor to North American Rockwell Corporation Filed Mar. 22, 1968, Ser. No. 715,347

Int. Cl. G11c 7/04

U.S. Cl. 340—174 2 Claims

ABSTRACT OF THE DISCLOSURE

The method of this invention is directed to applying a prepulse signal, having an amplitude substantially equal to the ½-select current, to each of the memory cores at selected times to minimize or completely eliminate the signal degradation caused by changes in environmental temperature.

BACKGROUND OF THE INVENTION

This invention pertains to the field of magnetic core memories and, more particularly, to a method of operating magnetic core memories of the ferrite type so as to minimize or completely eliminate the degradation which occurs to the sense line signal when the core information is read-out at a temperature different from that at which it was written in. Ferrite materials for core memories are in widespread use today. One of the problems associated with the use of ferrites and other magnetic material as cores is the noise which is caused when a ½-select current signal is sent through all of the cores in a row or column. Each of the cores in that particular row or column generates a noise signal which is induced into the sense winding and which is additive to the point where their sum will exceed the binary one output signal read from a selected core.

Various patents exist in the prior art for minimizing or completely eliminating this particular problem. One such patent is U.S. Pat. No. 3,329,940 entitled Magnetic Core Storage Device Having a Single Winding for Both the Sensing and Inhibit Function, by C. D. Barnes et al., which is assigned to North American Aviation, Inc., the assignee in title to the present invention. In that particular patent the problem of additive noise from each of the cores on a row or column receiving the ½-select current is controlled by placing one-half of the cores in a row or column such that the noise signals of one-half are of the opposite polarity of the remaining half such that when they are added together the ½-select noise signals are substantially equal to zero.

Another prior art device is disclosed in U.S. Pat. No. 3,149,313 entitled, Ferrite Matrix Storage Device, by G. Merz et al., in which a special transformer coupling is used to produce in the readout wire a compensation pulse which effectively cancels the noise pulse.

Another noise reduction system is disclosed in U.S. Pat. No. 3,191,163, entitled, Magnetic Memory Noise Reduction System, by D. J. Crawford, in which the noise problem that exists in a conventional two-core-per-bit memory because of direct coupling between bit and sensed lines during write time and because of the cumulative effects of Δ noise induced in the sense lines by unselected cores disturbed by the bit currents are minimized by reversing the sense of each sense winding loop at equally distant spaced points along each pair of rows. The sense lines so arranged receive a plurality reversal of half the segments of a row with respect to the other half effectively cancelling the noise output.

Each of the aforementioned patents recognizes the noise problem that is associated with the ½-select current being sent through the rows and columns of a core matrix, but there appears to be a complete lack of appreciation for the sense line signal degradation that occurs when read out is performed at a different temperature from the write in temperature.

SUMMARY OF THE INVENTION

The method of this invention is directed to exposing each of the cores to substantially a ½-select current pulse, that is a prepulse having an amplitude substantially equal to the ½-select current pulse at power turn on and interrogation of the core, and at preselected times during the operation of the memory, to minimize the temperature effects manifested by signal degradation when the read-out of the cores occurs at a temperature which is different from the write in. When in a hardware prepulse mode, normal memory operation is not allowed. The prepulse initiate control begins the prepulsing sequence by inhibiting all currents except the bit currents, zero setting the output register, and inhibiting the sense amplifier strobe. A series of write-cycle request and the proper addresses are generated, resulting in bit current flow through all bit lines disturbing all cores. Upon completion of a series of prepulses to all cores, normal memory operation is restored. The prepulse can be applied to the cores at any time that the core memory is not in use. It is only necessary that the prepulse be applied whenever the temperature differential between the read-in and read-out temperatures has increased above a certain minimum value above which degradation of the signal will seriously effect the output of the core memory. The above operation can also be supplemented by performing, during the normal memory operation, a program which will provide a prepulse to every core at the required intervals.

Accordingly, it is an object of the present invention to provide an improved method for minimizing the temperature effects upon a magnetic core memory.

It is a further object of the present invention to provide a method wherein a prepulse is applied to a magnetic core to minimize the effects of temperature variations.

It is another object of the present invention to provide a method for operating magnetic core memories in large temperature differential environments.

The aforementioned and other objects of the present invention will become more apparent when taken in conjunction with the following description and drawings, throughout which like characters indicate like parts, and which drawings form a part of this application.

BRIEF DESCRIPTION OF THE PREFERRED EMBODIMENT

Figure 1:
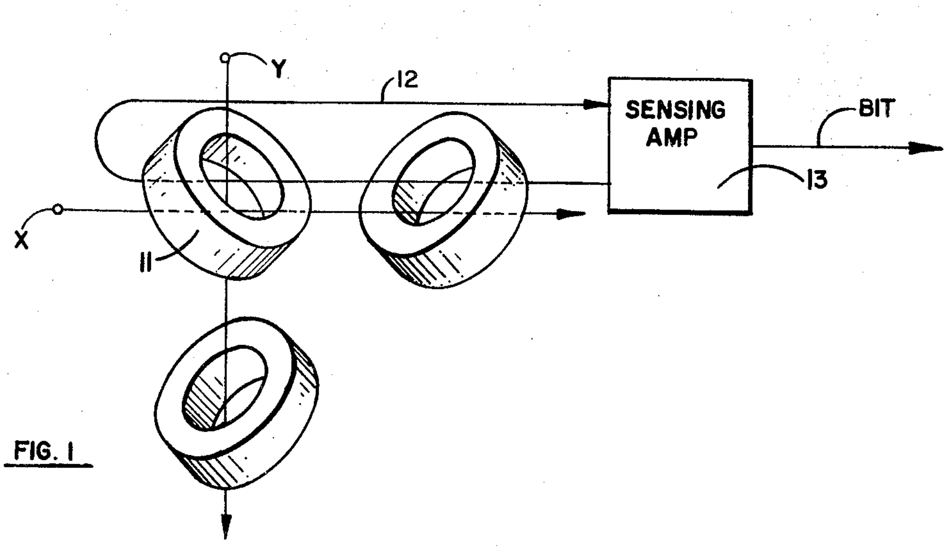
FIG. 1 illustrates in partial projection view a plurality of magnetic cores as usually arranged in core memories.
Figure 2:
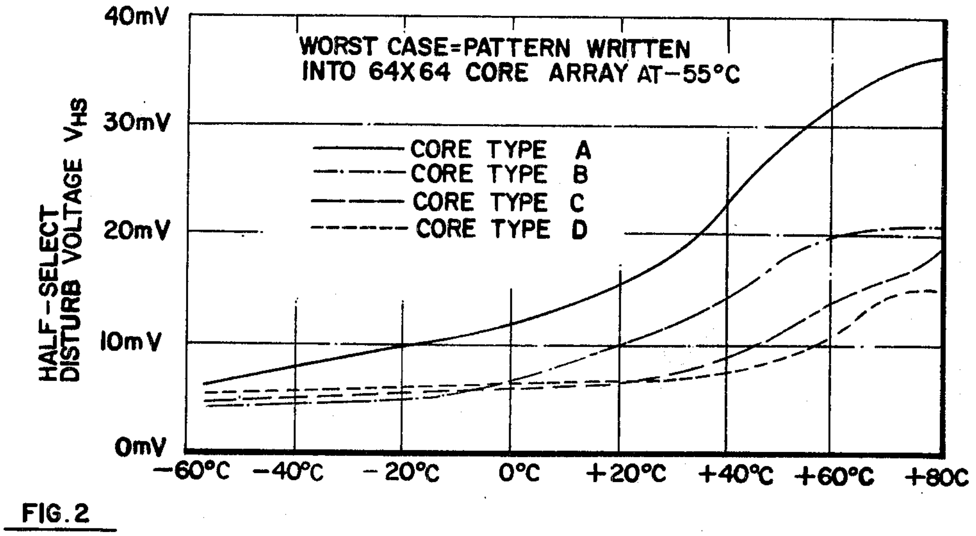
FIG. 2 is a chart illustrating in graphic form view the increase in the ½-select disturb voltage, $V_{HS}$, for various types of ferrite cores as a function of temperature.

Referring to FIG. 1, a single magnetic core 11 is shown with current carrying wires, *x* and *y* shown passing through the center of the core substantially perpendicular to each other. If a ½-select current is applied to both the *x* and *y* terminals, the polarity of the magnetic core may be changed if the direction of the currents are different from when the core was first magnetized. When the polarity of the magnetic core changes it induces a current in the sense line 12, which is sensed and amplified by the sensing amplifier 13 and sent out as a usable bit of information. The signal amplitudes as received by the sensing amplifier 13 for various types of cores used as core 11 are shown in FIG. 2.

Reading information from a magnetic core memory at a temperature different from that at which it was stored is defined as cross-temperature memory operation. When the read temperature is greater than the write temperature, we have what is called positive cross-temperature operation. When the situation is reversed, we have the condition which will be defined as negative cross-temperature core operation. The cores used to achieve the results shown in FIG. 2 were 30 mil lithium cores. In FIG. 2 the sense line signal output of coincident core arrays is the summation of the selected core output voltage and the disturbed core ½-select voltages. Hereinafter, the core "one" voltage will be referred to as $V_1$, the core "zero" voltage will be referred to as $V_z$, and the summation of all the core ½-select disturb voltages will be referred to as $V_{HS}$. Core array sense lines are wired to provide a maximum cancellation of core ½-select disturb voltages, but complete cancellation is never achieved.

Figure 3:
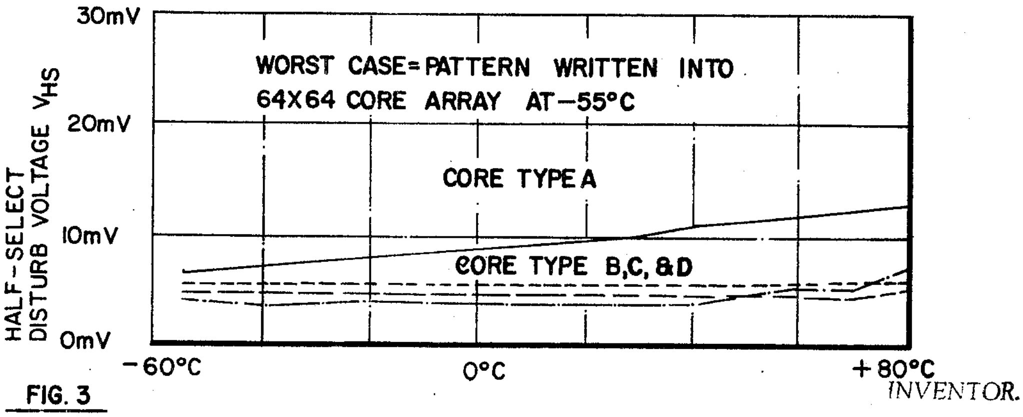
FIG. 3 is a chart illustrating in graphic form view the ½-select disturb voltage for each of the core types of FIG. 2 after the application of a second ½-select disturb voltage.

Under cross-temperature operation, the amplitude of the sense line ½-select disturb voltage $V_{HS}$ is increased significantly. Tests were performed on four 64 x 64, 30 mil lithium core arrays, each wired with a different wide-temperature lithium core. The increase of $V_{HS}$ under positive cross-temperature conditions was measured using the manufacturer's recommended nominal currents with a 400-ns rise time in all cases. A worst case pattern for maximum sense line disturb voltage $V_{HS}$ was loaded into each array at −55° C. The peak amplitude of $V_{HS}$ was then measured at each successive increasing test temperature point, using a previously undisturbed line of 64 cores. The resultant amplitudes are displayed in FIG. 2 for the first current pulse, having an amplitude equal to a ½-select current. While at the test temperature, the line of cores being observed was given a second ½-select current pulse and the resulting sense line voltage $V_{HS}$ was measured and plotted in FIG. 3. All of the core types tested exhibited significant ½-select disturb voltage increases as shown in FIG. 2 for the application of a first ½-select current pulse. Upon the application of the second ½-select current pulse, there was a marked improvement or decrease downward in the value of $V_{HS}$.

The ½-select disturb voltage $V_{HS}$ can add to or subtract from the selected core output voltage. Positive cross-temperature tests have shown that $V_{HS}$ peaking time for the first ½-select disturb pulse is approximately the same as the peaking time of a core "one" output signal. This means that the amplitude of $V_{HS}$ can subtract directly from the peak amplitude of $V_1$.

Figure 4:
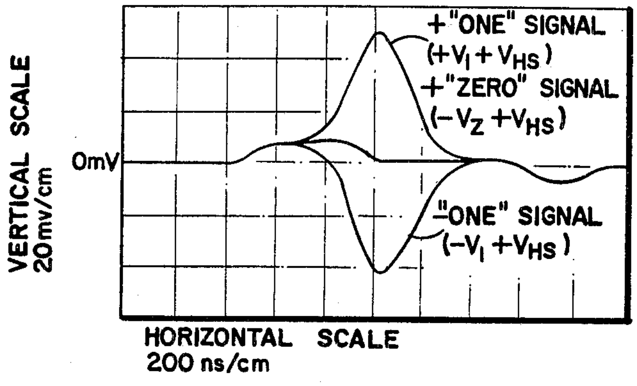
FIG. 4 is a chart illustrating in graphic form view a worst case sense line output signals for a "one" and a "zero" signal when the read-write operation is performed at 75° C.

Referring to FIG. 4, wherein a type-B core was tested at a constant temperature of 75° C. Read-write operations with a worst-case pattern were performed using non-staggered, 400-ns rise time, and ½-select current pulses. The resulting sense line outputs for a positive "one," a negative "one," and a "zero" is displayed. Each of the output signals of the selected cores is modified by the value of $V_{HS}$.

Figure 5:
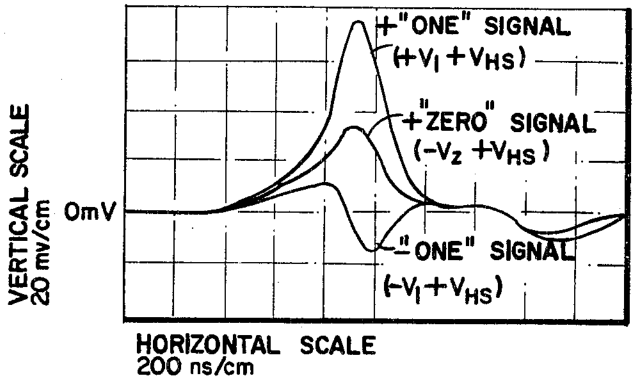
FIG. 5 is a chart illustrating in graphic form view the same worst case sense line output signals when write-in is performed at −55° C. and read-out is performed at 75° C.

Referring to FIG. 5, wherein is displayed the same voltages generated by the same array at 75° C. after being loaded with a worst-case pattern at −55° C. Compared with the results shown in FIG. 4, the "zero" output is very much increased, and the negative "one" output is degraded to the point as to be no longer distinguishable as a "one."

Figure 6:
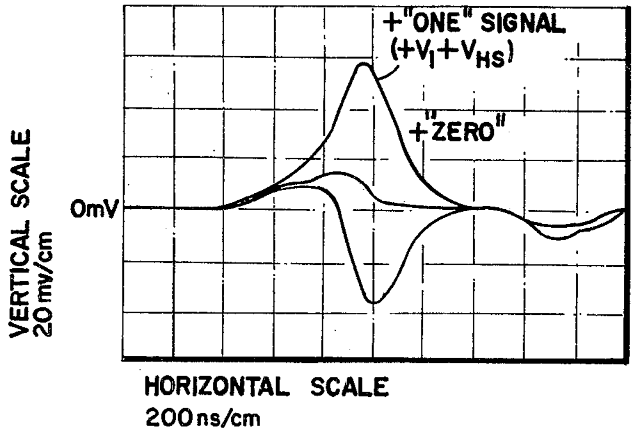
FIG. 6 is a chart illustrating in graphic form view the same worst case sense line output signal when write-in is performed at −55° C. and read-out is performed after one prepulse at 75° C.

Referring to FIG. 6, the same signals generated by the same core array once again loaded at −55° C. with a worst-case pattern, but this time the cores were exposed to a ½-select current pulse prior to interrogation at 75° C. A considerable improvement in signal characteristics is observed.

Figure 7:
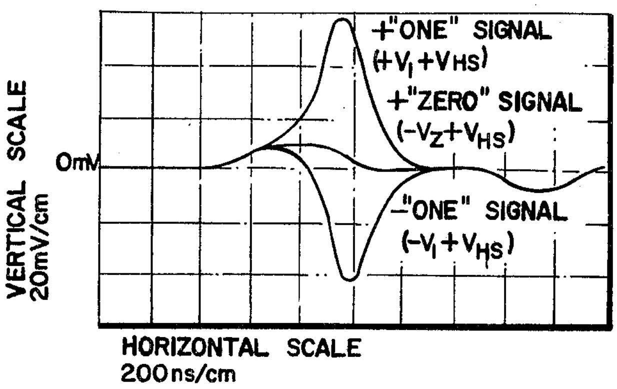
FIG. 7 is a chart illustrating in graphic form view a worst case sense line output when the read-write operation is performed at −55° C.
Figure 8:
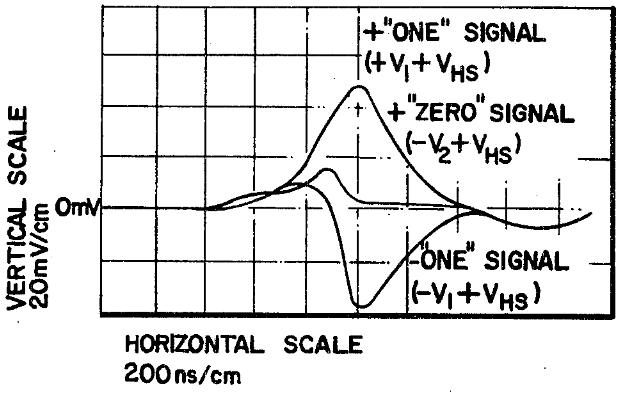
FIG. 8 is a chart illustrating in form view the same worst case sense line output signal when write-in is performed at 75° C. and read-out is performed at −55° C.
Figure 9:
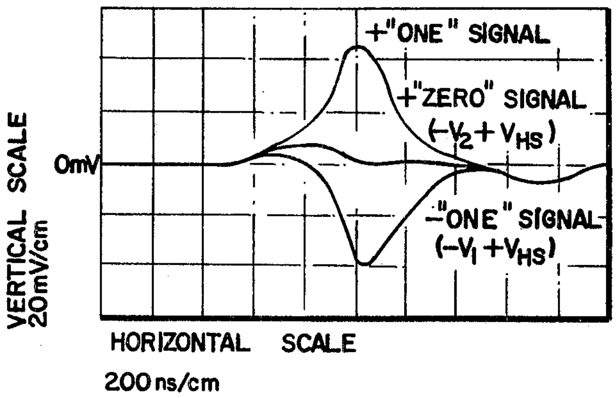
FIG. 9 is a chart illustrating in graphic form view the same worst case sense line output signal when write-in is performed at 75° C. and read-out is performed after one prepulse at −55° C.

Tests have shown that the signal degradation that occurs with negative cross-temperature conditions is not so severe as that experienced with positive cross-temperature conditions. FIG. 7 shows the signal outputs obtained when the read-write operation was performed with a worst-case pattern at −55° C. FIG. 8 shows the resulting signals obtained with negative cross-temperature operation. A worst-case pattern was loaded at 75° C. and the signals were read-out at −55° C. The degradation of these signals is not as severe as that shown in FIG. 5 for the positive cross-temperature condition. FIG. 9 shows the signals generated by the same array loaded with a worst-case pattern at 75° C., but this time exposed to a ½-select current prepulse at −55° C. prior to interrogation. The resulting signals are improved. The exact reasons for this improvement after applying a prepulse is not exactly known by the inventor, but experimentation has proved that substantial improvement results in the core array when each of the cores is prepulsed. The test then presented shows that memory errors due to degraded signals can occur in the cross-temperature mode of operation. However, reliable memory operation can be achieved if cross-temperature core array characteristics are considered in the memory system design.

Re-writing the contents of a memory at frequent intervals (intervals short enough to minimize temperature changes between re-writes) would eliminate cross-temperature conditions and the resulting signal degradation. However, this would not solve the problem of cross-temperature where the memory power is turned off during temperature excursions. In this case, a series of ½-select current pulses could be provided for all cores at power turn on to minimize the cross-temperature effects as demonstrated in FIG. 6. The same ½-select disturb pulses could also be used periodically during memory operation to minimize cross-temperature effects.

Figure 10:
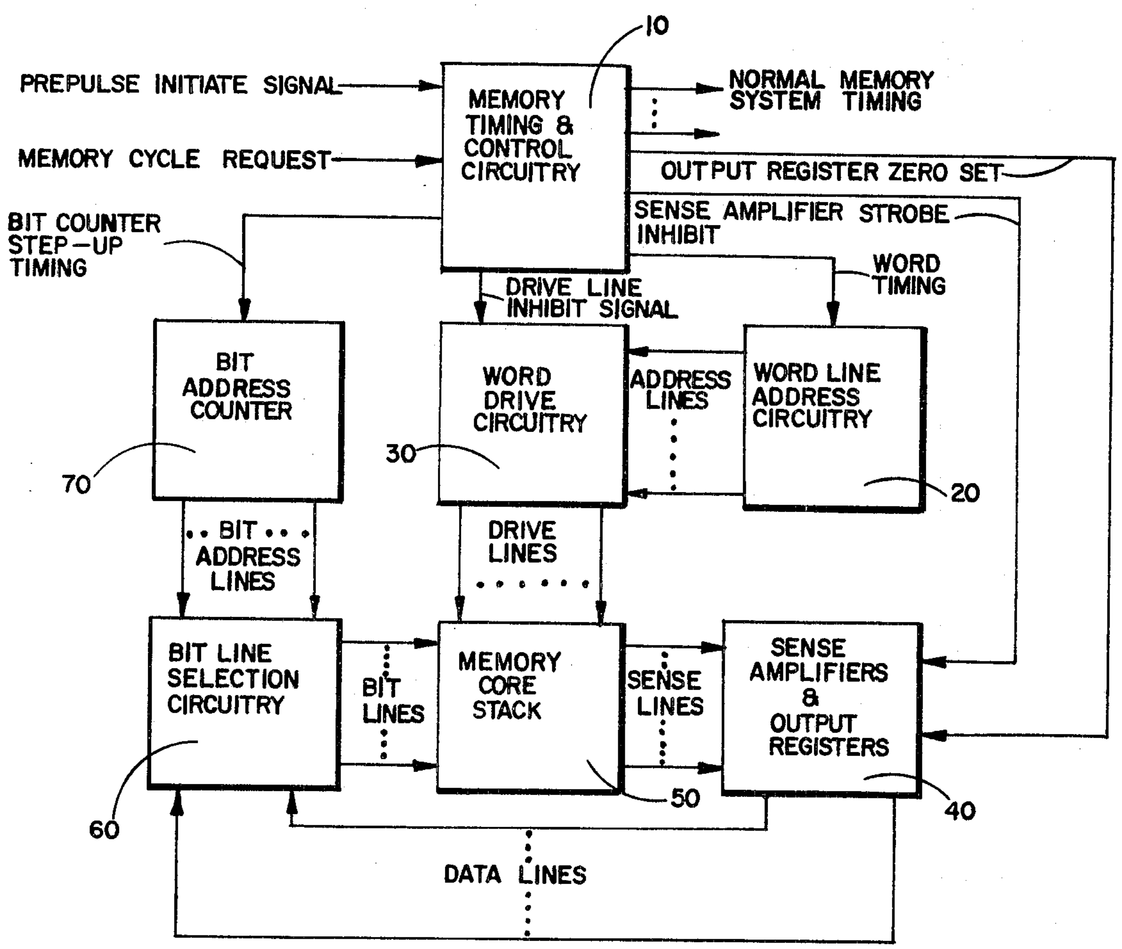
FIG. 10 illustrates in block diagram form the method of this invention as applied to a conventional computer memory system.

Referring now to FIG. 10 wherein the method of this invention is shown applied to a standard computer memory depicted in block diagram form as being comprised of memory timing and control circuitry 10, the outputs of which are fed to and control the bit address counter 70, the word drive circuitry 30, and the word line address circuitry 20, and the sense amplifier and output registers 40. The bit address counter 70 sequences the output of the bit line selection circuitry 60 which is fed to the memory core stack 50 to select the particular bit lines to be prepulsed. In applying the method of this invention, a prepulse initiate signal is sent to the memory timing and control circuitry 10, normal memory operation is not allowed at this time. The prepulse initiate control signal begins the prepulsing sequence where ½-select current is allowed to flow through the bit lines to the memory core stack 50. The sense amplifier strobe is inhibited, and the word drive circuitry 30 is also inhibited by the drive line inhibit signal, the timing and control circuitry 10. A series of memory cycle requests are generated to allow the ½-select current to flow through the bit lines to the memory core stack as determined by the bit address counter 70. Upon completion of the series of the prepulses to all memory cores, normal memory operation is restored.

While there has been shown what is considered to be the preferred embodiment of the present invention, it will be manifested that many changes and modifications may be made therein without departing from the essential spirit of the invention. It is intended, therefore, in the annexed claims, to cover all such changes and modifications as may fall within the true scope of the invention.

What is claimed is:

1. A method for minimizing the temperature effects upon a magnetic core memory comprising the steps of, monitoring the temperature of said magnetic core memory, applying a current prepulse to each core of said core memory before the readout of information stored in said memory if the temperature change is in excess of a temperature change which would substantially affect the logic state of the stored information.

2. A method for minimizing the cross-temperature effects upon a memory which utilizes a plurality of ferrite cores as the memory element, comprising the steps of, monitoring the temperature of said memory, first sequentially applying a current prepulse to each one of said plurality of ferrite cores after the power turn on of said memory and before beginning the normal operation of said memory if the temperature change is in excess of a temperature change required to substantially affect the logic state of information stored in said memory, second sequentially applying a current prepulse to each one of said plurality of ferrite cores prior to a change in the temperature of said memory which would substantially affect the logic state of the stored information.

References Cited

UNITED STATES PATENTS

| | | | |
|---|---|---|---|
| 3,238,516 | 3/1966 | Hore | 340—174 |
| 3,293,626 | 12/1966 | Thome | 340—174 |
| 3,321,749 | 5/1967 | Overn | 340—174 |
| 3,329,940 | 7/1967 | Barnes | 340—174 |
| 2,919,434 | 12/1959 | Mestre | 340—174 |
| 3,060,418 | 10/1962 | Buchholz et al. | 340—174 |
| 3,354,443 | 11/1967 | Kuhlmann | 340—174 |

OTHER REFERENCES

Foglia, H. R.: "Non-Destructive Read Out for Core Memory," IBM Tech Disc Bulletin, vol. 6, No. 1, June 1963, p. 100.

TERRELL W. FEARS, Primary Examiner

K. E. KROSIN, Assistant Examiner